United States Patent
Lord

(10) Patent No.: US 9,342,568 B2
(45) Date of Patent: May 17, 2016

(54) REDUCING METADATA CONTROLLER COMMUNICATION VOLUME

(75) Inventor: Stephen P. Lord, Prior Lake, MN (US)

(73) Assignee: Quantum Corporation, San Jose, CA (US)

( * ) Notice: Subject to any disclaimer, the term of this patent is extended or adjusted under 35 U.S.C. 154(b) by 1036 days.

(21) Appl. No.: 13/474,160

(22) Filed: May 17, 2012

(65) Prior Publication Data

US 2013/0311638 A1    Nov. 21, 2013

(51) Int. Cl.
- *G06F 15/173* (2006.01)
- *G06F 17/30* (2006.01)
- *G06F 11/30* (2006.01)

(52) U.S. Cl.
CPC ...... *G06F 17/30557* (2013.01); *G06F 11/3027* (2013.01); *G06F 11/3058* (2013.01); *G06F 2201/81* (2013.01); *G06F 2201/88* (2013.01)

(58) Field of Classification Search
CPC ... H04L 29/08072; H04L 29/06; H04L 43/00; H04L 12/2602; H04L 41/22
See application file for complete search history.

(56) References Cited

U.S. PATENT DOCUMENTS

| | | | |
|---|---|---|---|
| 6,279,078 B1* | 8/2001 | Sicola | G06F 11/1666 711/119 |
| 2008/0250210 A1* | 10/2008 | Ash | G06F 11/2033 711/141 |
| 2009/0006662 A1* | 1/2009 | Chen | G06F 13/28 710/22 |
| 2010/0191925 A1* | 7/2010 | Blount | G06F 12/0866 711/160 |

* cited by examiner

*Primary Examiner* — Philip Chea
*Assistant Examiner* — Van Kim T Nguyen
(74) *Attorney, Agent, or Firm* — Eschweiler & Associates, LLC

(57) ABSTRACT

Apparatus, methods, and other embodiments associated with reducing metadata controller communication volume are described. One example apparatus produces tracking data by tracking metadata controller communications and then controls which of two different types of metadata controller communication message types are used for metadata controller communications based, at least in part, on the tracking data. One message type provides actual state and/or location information about a metadata controller. A second message type provides only information about the state and/or location information available at a metadata controller. Selectively using the second message type facilitates reducing metadata controller communication volume.

14 Claims, 8 Drawing Sheets

REDUCING METADATA CONTROLLER COMMUNICATION VOLUME

BACKGROUND

Every day there is more and more data and there are more and more people and processes that want to access that data. Managing the ever increasing amount of data for the ever increasing number of accessing entities continues to produce new challenges. One approach to managing data so that it can be shared by multiple entities includes distributing data between multiple computers and storage devices, creating multiple access controllers that manage access to the data, and then allowing different entities access to different access controllers. This data management approach may facilitate actions including file creation, file storing, data storing, file sharing, and data sharing. The data management approach may provide enterprise data management features including online tiering, online archiving, de-duplication, replication, distributed data moving, partial file retrieval, shared file system support, and other features.

The number of computers, processes, and storage devices that can participate in a system that manages data can be truly staggering. For example, thousands of clients may interact with hundreds of servers and tens of thousands of storage devices. Millions of items may be stored and made available. Clients that access data, servers that control storing and providing data, and devices that store data may be connected in different ways including a storage area network (SAN), a local area network (LAN), and other connections. In one example, LAN-based access may be provided using clustered gateway systems. To work well together, these devices may need to communicate their location, state, and other information to various controllers or to each other.

In a managed data environment, the data to be shared and accessed does not exist in a vacuum. There is data about the data that is also stored to facilitate locating, using, protecting, replicating, and de-duplicating data. This data about the data may be referred to as metadata. Specialized devices and/or processes that may be referred to as metadata controllers may be tasked with managing metadata. To access data, clients may communicate with one or more metadata controllers. Being able to effectively access stored data is facilitated by communicating with a metadata controller. Communicating with a metadata controller requires a client to know things like where a metadata controller is located, paths for reaching that metadata controller, the state of a metadata controller (e.g., up, down, slow, secure, compromised, etc.), and other things. Conventionally, a name server protocol may have kept clients aware of the location and state of various metadata controllers.

Communicating with a metadata controller may have been complicated by the fact that metadata controller processes could move around a data management environment. For example, a metadata controller process could move from a heavily burdened server to a less burdened server, or a metadata controller could move from a server whose network connections are over-whelmed to a server whose network connections are not so busy. There are many reasons why a metadata controller could migrate between servers and/or server processes. Regardless of the reason why a metadata controller moved, a client may wish to keep track of where a metadata controller is located and may wish to keep track of the state of the metadata controller. A client may wish to have visibility into the state of a metadata controller to facilitate actions like understanding when, if ever, a data request will be satisfied, whether a data request is likely to complete in a relevant time period, whether a metadata controller can satisfy a data request, whether a metadata controller is still alive, and other data access issues.

As already mentioned, conventionally, a name server protocol may have kept clients aware of the location and state of various metadata controllers. However, as data management environments have grown, conventional communication protocols employed by conventional name servers may have produced undesirable side effects as the volume of communications between clients and metadata controllers reached burdensome and/or fatal proportions. For example, an unacceptably or undesirably large amount of the communication bandwidth in a data management environment may have been consumed by metadata controller messages that sought to keep clients informed about the location and state of a metadata controller.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
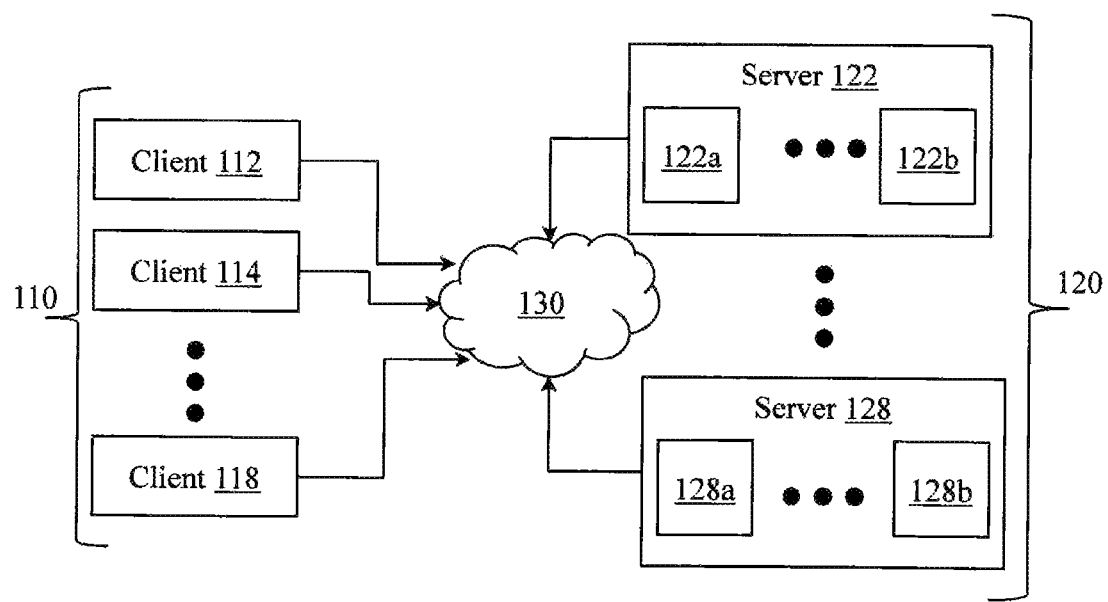
FIG. 1 illustrates an example data management environment.

Example systems and methods concern reducing metadata controller communication volume. A name server protocol may have kept clients aware of where metadata controllers were located and their states. However, as the number of clients and metadata controllers increased, the amount of communication bandwidth that was consumed just keeping clients aware of metadata locations and states may have grown to undesirable and/or unacceptable levels. The communication bandwidth consumed was a function of both the number of messages communicated between clients and metadata controllers and the size of the messages. Put another way, the volume of metadata controller communication is a function of both the frequency and the size of metadata controller messages.

Conventional approaches to reducing metadata controller volume focused on limiting the number of messages. For example, limits may have been imposed on the number of metadata controller communication messages per second that could be communicated. While this approach is intuitively obvious, it has limits because clients really do need to be kept aware of the location(s) and/or state(s) of metadata controllers with which they interact. There is a finite amount of time that a client can or should be made to wait to receive an, update on a metadata controller location or state.

Example apparatus and methods described herein reduce metadata controller communication volume by addressing the size of messages communicated between clients and metadata controllers. Volume is a function of both the number of messages communicated and the size of those messages. Finding a way to reduce the size of the messages communicated can reduce metadata controller communication volume as much, or even more than simply reducing the number of messages. In one embodiment, reducing the size of messages in conjunction with reducing the number of messages may be employed to reduce metadata controller communication volume.

Understanding the content of the messages that conventional systems communicate is a first step towards understanding how to reduce the size of metadata controller location and state messages. Some conventional messages may have included a map of addresses for metadata controllers. These messages may have been sent to multiple clients. In an environment where there are thousands of metadata controllers and tens of thousands of clients, this could lead to hundreds of thousands of messages that each included the location and state information for the thousands of metadata controllers. Experience shows that while metadata controllers can change state and can change location and thus providing the complete list of locations and states is important, that usually metadata controllers are stable and non-migratory. When metadata controllers are stable (e.g., not changing state) and non-migratory (e.g., resident in same process on same server), it may not make sense to continuously report the same state and location information, over and over. Additionally, while clients may theoretically be interested in the location and state of all metadata controllers, in practice, some clients may only be interested in the location and state of the metadata controllers with which they are actually interacting or are likely to interact. While large messages that convey a large amount of information to all entities have their place and value, smaller messages that convey less information to fewer entities may also have their place and value.

Thus, example apparatus and methods monitor the communication of location and state information in metadata controller communications and selectively transmit a, second, shorter message when certain state and location stability and/or migratory conditions are met. For example, after determining that a threshold number of communications of a first message type have provided the same or substantially the same information, example apparatus and methods may control the communicating parties to stop sending the same or substantially same message having the first message type and may control communicating parties to start transmitting a second, different type of message. The second, different type of message may not contain all the state and location information as the first type of message. Instead, the second type of message may simply identify the two parties to the communication and may provide information from which a determination about a change in state or location can be made. By way of illustration, instead of sending an Internet Protocol (IP) address list, a hash (cryptographic or otherwise) can be computed from the IP address list. After having transmitted the same IP address list a threshold number of times in a row, instead of sending the same IP address list again, the hash may be transmitted. The receiver can determine whether the IP address list has changed by examining the hash. If a change is detected, then example apparatus and methods can control the communicating parties to return to the first type of message where the IP list is transmitted. With the up-to-date IP list available, the change can be accounted for and data management can proceed. While a hash is mentioned, one skilled in the art will appreciate that other methods may be employed for communicating information about location and state. Additionally, while location and state are described, one skilled in the art will appreciate that other information that is relevant to client/metadata communication may be provided. While reducing message volume is described in the context of a name server, one skilled in the art will appreciate that example systems and methods may be employed in other contexts that produce undesirable message volume due, for example, to repetitive transmission of status updates that change infrequently.

In one example, the second message type may have the form:

sender_information_identifier:::::receiver_information_identifier.

The sender information identifier may be, for example, a hash value that replaces the sender information that would have been provided in the first message type. Similarly, the receiver information identifier may replace receiver information that may have been provided in the first message type. The sender information identifier provides the receiver with sufficient information to determine whether the sender information from which the sender information identifier was generated has changed from the receiver's point of view. The receiver identifier information provides the receiver with information from which the receiver can decide whether the sender still has an accurate picture of the receiver information. For example, the receiver information identifier may be a hash that the sender previously received from the receiver. The receiver can compare the hash that is returned by the sender to a hash that the receiver computes before transmitting its next message. If the hashes match, then there has not been a change and the communication can continue between the two parties using the second, smaller message. If the hashes do not match, then there has been a change and the communication between the parties can return to the first message type where the actual information is exchanged, rather than just the identifier of the information. Should one of the communicating parties restart or otherwise lose state, then that party may no longer have a valid hash of the other parties' state. In this case, the restarting party may send their now invalid hash value. Transmission of the invalid hash value will be noticed and may cause the other party to switch back to the long form message in response.

The following includes definitions of selected terms employed herein. The definitions include various examples and/or forms of components that fall within the scope of a term and that may be used for implementation. The examples are not intended to be limiting. Both singular and plural forms of terms may be within the definitions.

ASIC: application specific integrated circuit.
CD: compact disk.
CD-R: CD recordable.
CD-RW: CD rewriteable.
DVD: digital versatile disk and/or digital video disk.
I/O: input/output
LAN: local area network.

PCI: peripheral component interconnect.
PCIE: PCI express.
RAM: random access memory.
DRAM: dynamic RAM.
SRAM: synchronous RAM.
ROM: read only memory.
PROM: programmable ROM.
USB: universal serial bus.
WAN: wide area network.
PPP: Point-to-Point protocol References to "one embodiment", "an embodiment", "one example", and "an example", indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores signals, instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, and other entities. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and other circuits. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and other items, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

FIG. 1 illustrates an example data management environment. The environment includes a set 110 of clients (e.g., client 112, client 114, . . . client 118). The set 110 of clients may communicate with a set 120 of servers (e.g., server 122, . . . server 128). A server may host zero or more metadata controller processes. Server 122 is illustrated hosting metadata controller processes 122a through 122b and server 128 is illustrated hosting metadata controller processes 128a through 128b. The set 110 of clients may communicate with the set 120 of servers through a communication path 130. As described above, metadata controllers may migrate and may also change state. Clients like to have up-to-date information about metadata controller location and state. Therefore, metadata controller communications may occur between clients and servers.

Figure 2:
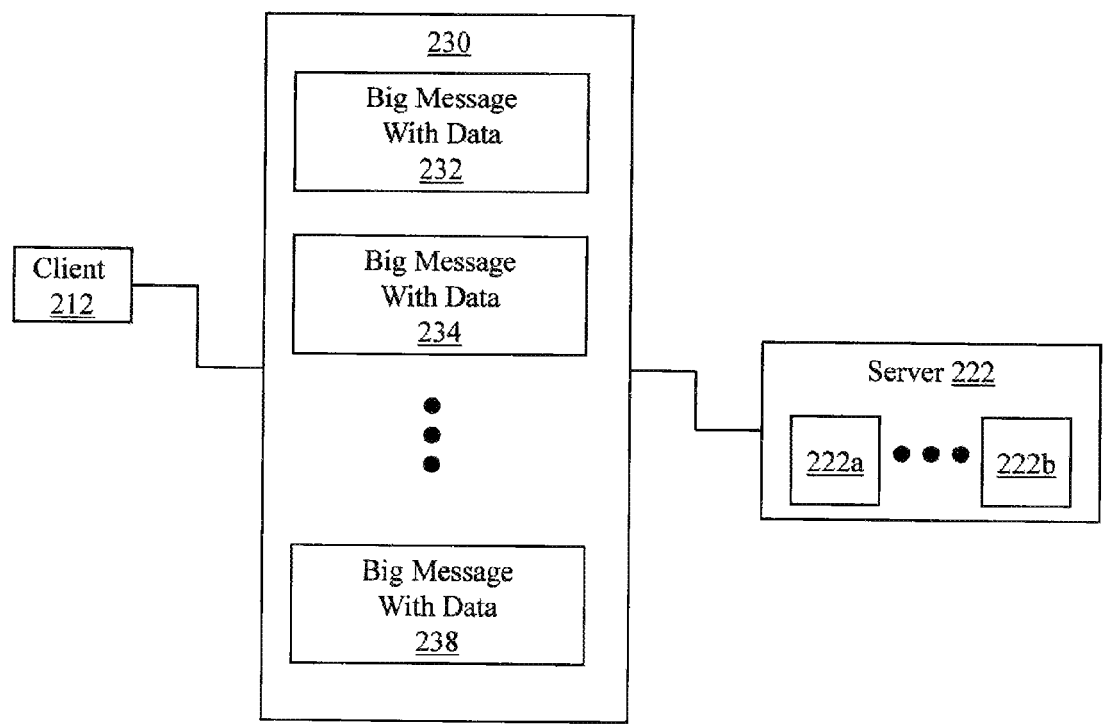
FIG. 2 illustrates an example metadata controller communication flow.

FIG. 2 illustrates an example metadata controller communication flow 230. In FIG. 2, a client 212 is communicating with a metadata controller(s) (e.g., 222a, 222b) on server 222. The communication between the metadata controller(s) and the client 212 may be using the conventional message type that includes metadata state and/or location information. For example, the flow 230 may include a big message 232, and big messages 234 through 238. The metadata controller communication volume is proportional to the number of messages, the frequency of the messages, and the size of the messages. In some situations, when metadata controllers are changing state and/or migrating, the big messages may frequently carry different information. However, when metadata controllers are not changing state and are non-migratory, then the big messages may be carrying the same or substantially the same information over and over. This may be wasteful of bandwidth resources.

Figure 3:
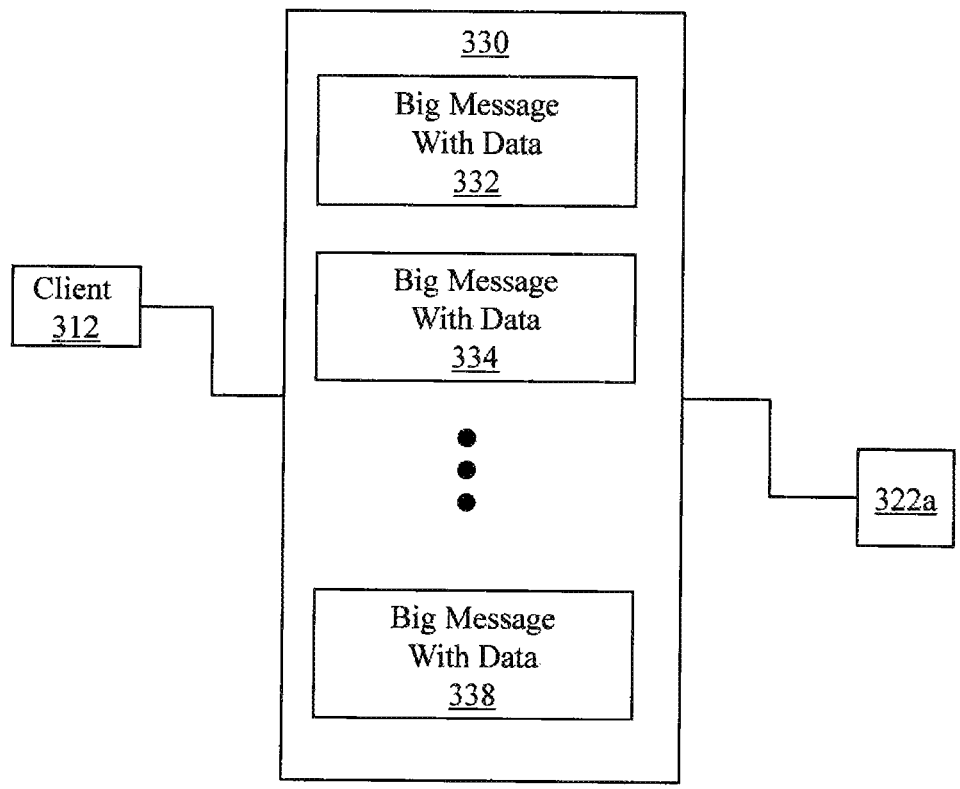
FIG. 3 illustrates an example metadata controller communication flow.

FIG. 3 illustrates an example metadata controller communication flow 330 between a client 312 and a single metadata controller 322a. The communication between the metadata controller 322a and the client 312 may be using the conventional message type that includes metadata state and/or location information. For example, the flow 330 may include a big message 332, and big messages 334 through 338.

Figure 4:
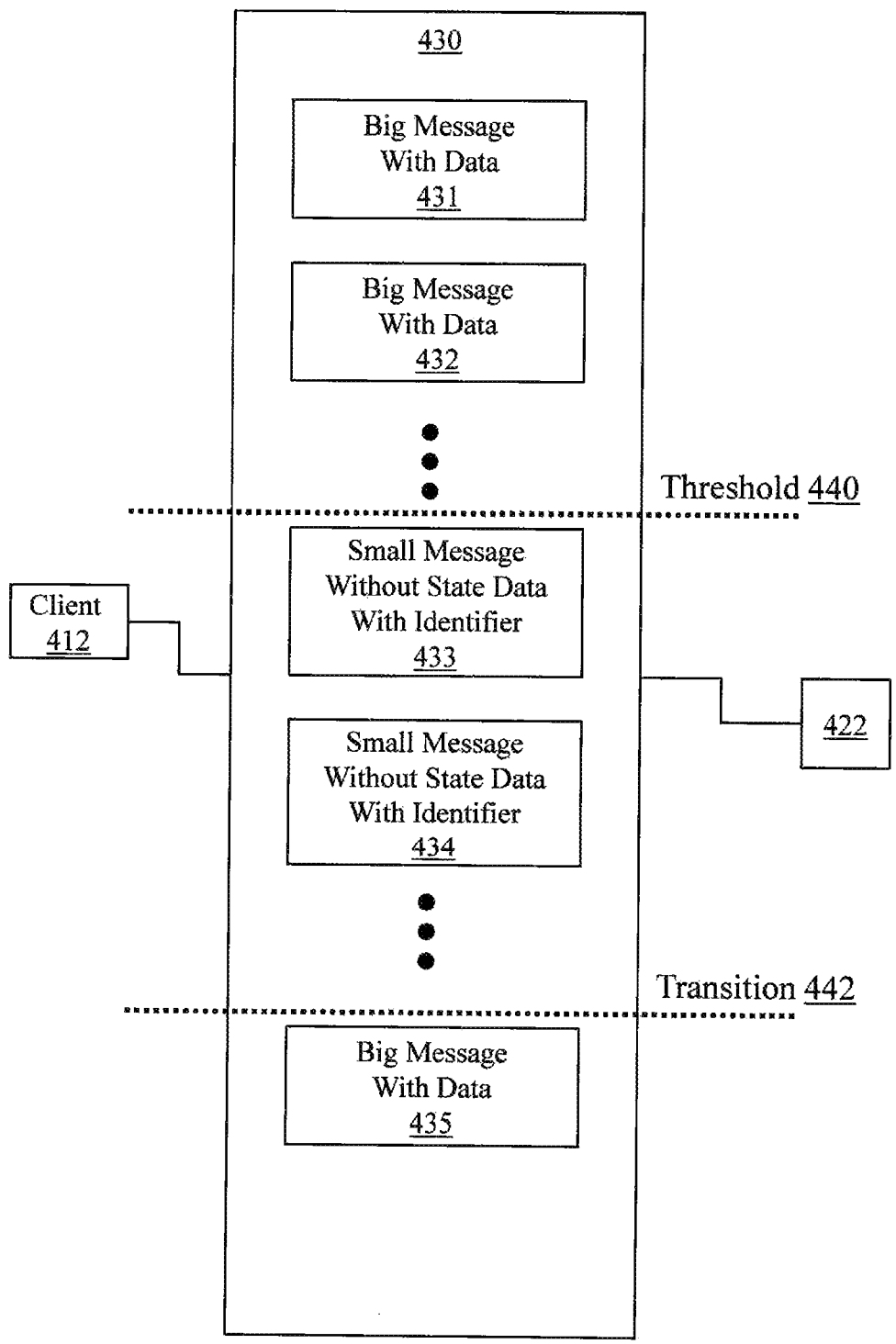
FIG. 4 illustrates an example metadata controller communication flow.

FIG. 4 illustrates an example metadata controller communication flow 430 as controlled by example apparatus and methods described and claimed herein. Message flow 430 illustrates traffic between a client 412 and a metadata controller 422. Initially, the traffic includes big messages 431 and 432 and other big messages that carry state and/or location information. After a period of time, a threshold 440 may be reached where a pre-determined and/or configurable number of similar and/or identical big messages have been communicated between the client 412 and the metadata controller 422. Once this threshold 440 has been reached, example apparatus and methods may choose to use a second, different message type to reduce metadata controller communication volume.

Thus, after the threshold 440 is reached, flow 430 changes over to communicating small messages 433 and 434 and other small messages that do not carry the state and/or location information. Instead of carrying the state and/or location information, the small messages carry an identifier that has information about the state and/or location information. The identifier may be, for example, a hash of the state and/or location information. After the threshold number of similar and/or identical messages were detected, example apparatus and methods may decide to use the smaller messages instead of continuing to repetitively send redundant information. The identifier in the small messages is configured to facilitate detecting when the state and/or location information changes. The state information may change, for example, when the metadata controller 422 experiences a state transition. Flow 430 illustrates the message type changing back to the original big message type after the transition was detected at 442. After the transition at 442, a big message with data 435 is transmitted. Flow 430 may continue to switch back and forth between the larger message type and the smaller message type as the threshold number of redundant messages are detected and as transitions are detected.

Figure 5:
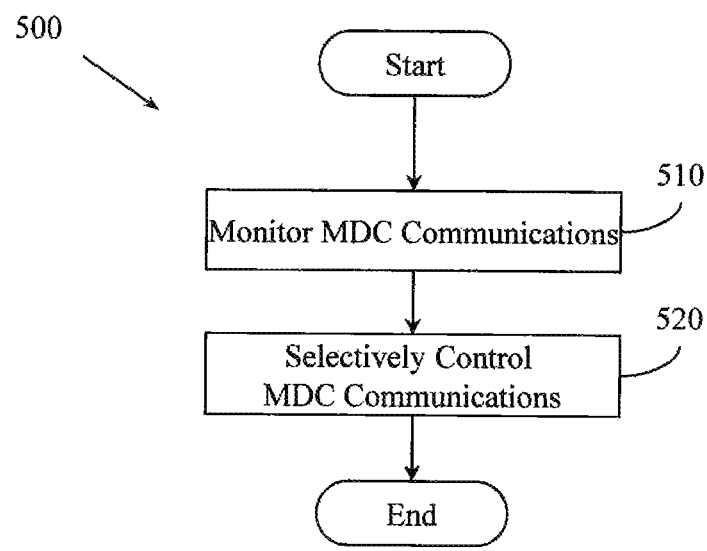
FIG. 5 illustrates an example method associated with reducing metadata controller communication volume.

FIG. 5 illustrates an example method 500 associated with reducing metadata controller communication volume. Method 500 includes the two actions of monitoring metadata controller (MDC) communications at 510 and selectively controlling MDC communications at 520. Monitoring MDC communications may include, for example, determining whether a threshold number of redundant messages have been sent within a period of time. Monitoring MDC communications may also include, for example, determining whether an identifier indicates that a state change has occurred. Controlling the MDC communications at 520 may include, for example, switching message types.

Figure 6:
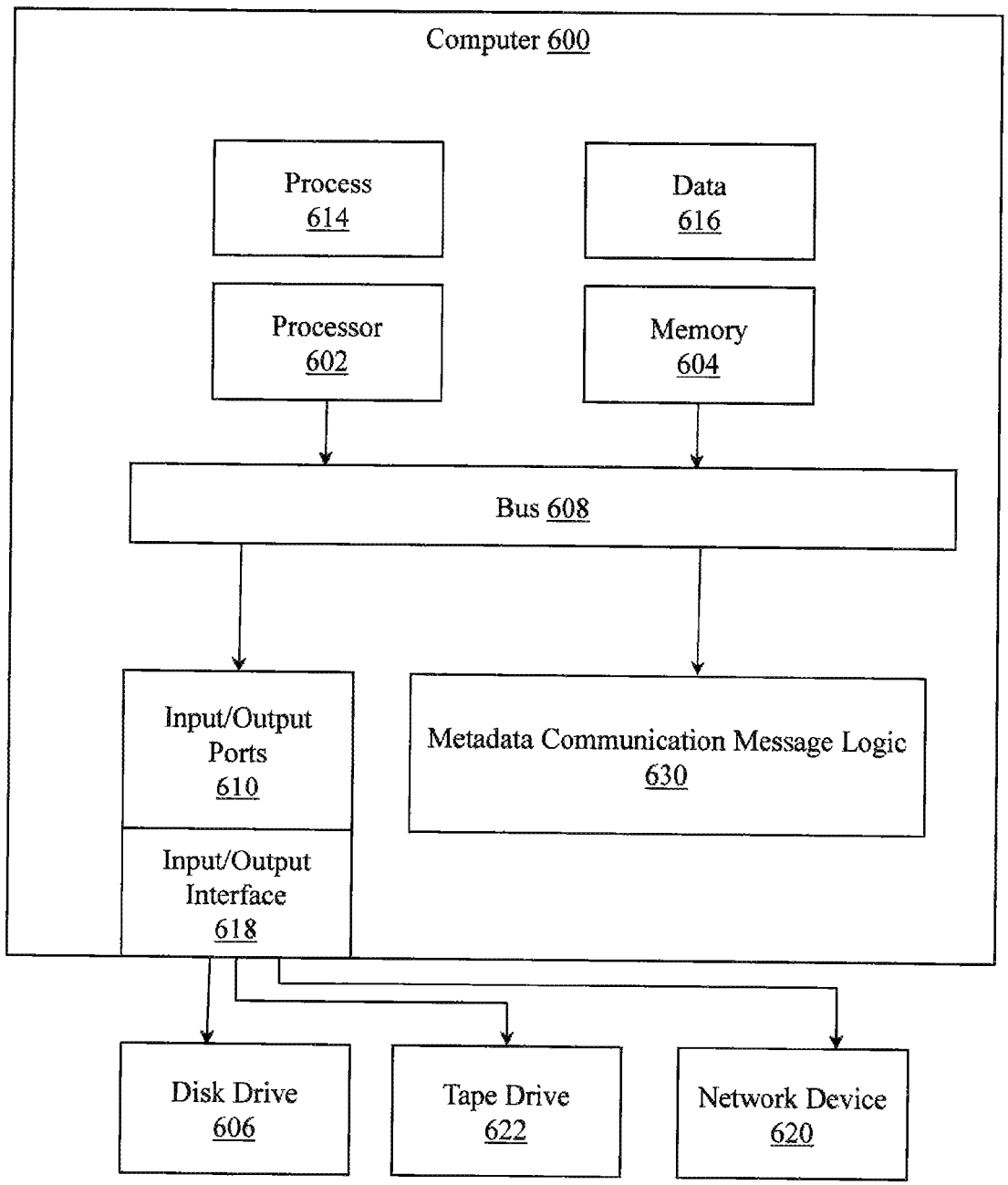
FIG. 6 illustrates an example computing environment in which example apparatus, systems, methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a metadata communication message logic 630 configured to reduce metadata controller communication volume by monitoring messages and state and by controlling message types. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Logic 630 may provide means (e.g., hardware, software, firmware) for communicating metadata controller state information in a first type of metadata controller communication in a data management system. This first type of metadata controller communication may be, for example, a relatively larger message that includes state, location, and other information. Logic 630 may also provide means (e.g., hardware, software, firmware) for communicating information about metadata controller state information in a second type of metadata controller communication in a data management system. This second type of metadata controller communication may be relatively smaller because it does not carry the state, location, or other information but instead carries an identifier (e.g., hash) or other data from which determinations about the state, location, and other information may be made. Logic 630 may also provide means for selectively switching between using the first type of metadata controller communication and the second type of metadata controller communication. The switching may be based, at least in part, on detecting the occurrence of a state transition in a metadata controller and on detecting the presence of redundant metadata controller communications of the first type.

The means associated with logic 630 may be implemented, for example, as an ASIC programmed to perform this special purpose programming. The means may also be implemented as computer executable instructions that are presented to computer 600 as data 616 that are temporarily stored in memory 604 and then executed by processor 602.

Generally describing an example configuration of the computer 600, the processor 602 may be a variety of different processors including dual microprocessor and other multi-processor architectures. A memory 604 may include volatile memory and/or non-volatile memory. Non-volatile memory may include, for example, ROM, PROM, and other non-volatile memory. Volatile memory may include, for example, RAM, SRAM, DRAM, and other volatile memory.

A disk drive 606 or tape drive 622 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a solid state drive (SSD), a flash memory card, a memory stick, and other devices. Furthermore, the disk 606 may be a CD-ROM drive, a CD-R drive, a CD-RW drive, a DVD ROM drive, a Blu-Ray drive, an HD-DVD drive, or other devices. The memory 604 may store a process 614 and/or a data 616, for example. The disk 606 and/or the memory 604 may store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and other devices. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Figure 7:
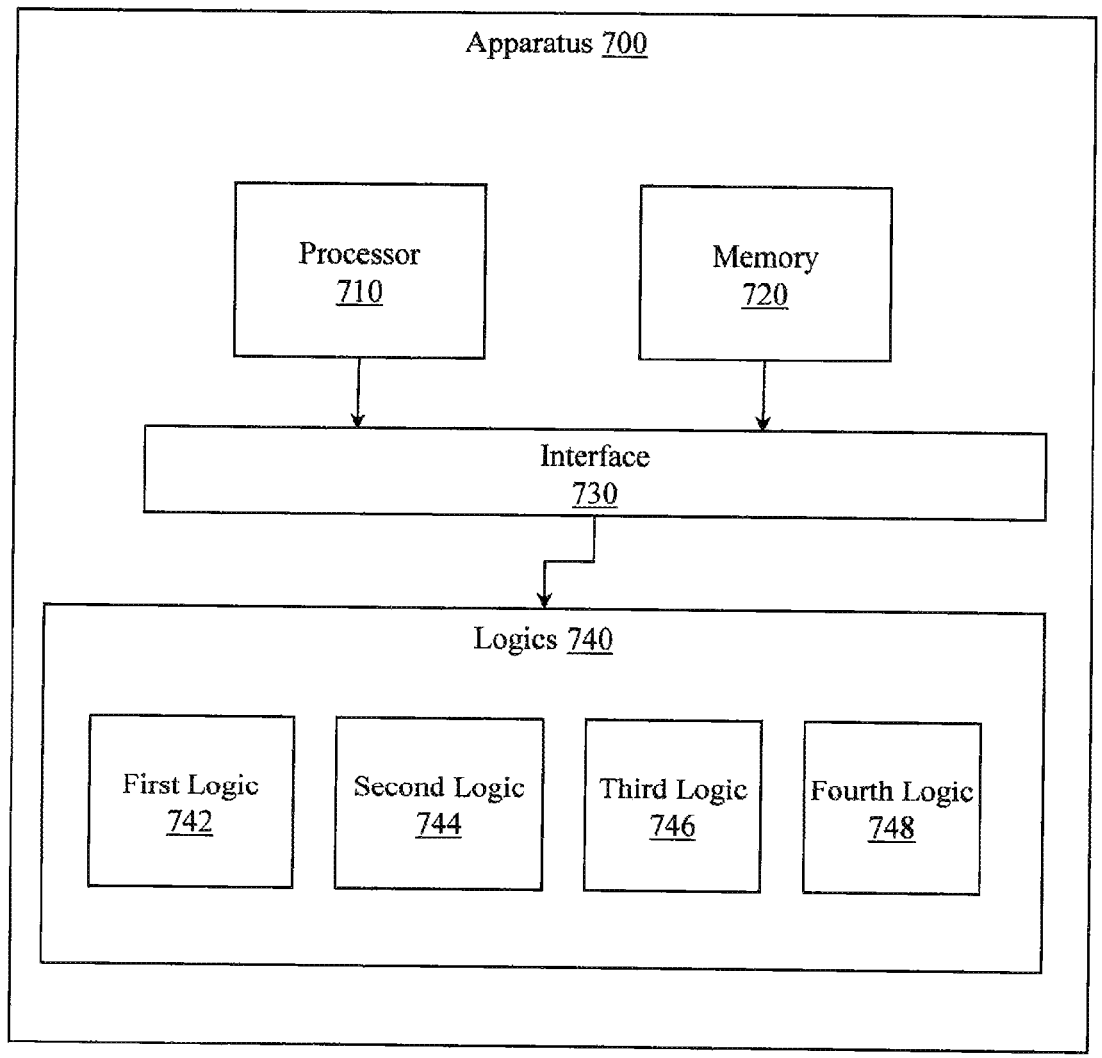
FIG. 7 illustrates an example apparatus associated with reducing metadata controller communication volume.

FIG. 7 illustrates an apparatus 700 for reducing metadata controller communication volume. Apparatus 700 includes a processor 710, a memory 720, a set 740 of logics, and an interface 730 to connect the processor 710, the memory 720, and the set 740 of logics. In one embodiment, apparatus 700 may be a special purpose computer that is created as a result of programming a general purpose computer. In another embodiment, apparatus 700 may include special purpose circuits that are added to a general purpose computer to produce a special purpose computer.

In one embodiment, the set 740 of logics includes a first logic 742, a second logic 744, a third logic 746, and a fourth logic 748. In one embodiment, the first logic 742 is configured to produce tracking data by tracking metadata controller communications. Tracking metadata controller communications may be performed, for example, at a client, at a metadata controller process, at a server, by a separate apparatus or process, or in other ways. Tracking metadata controller communications may include, for example, determining whether redundant communications are occurring and, if so, how many redundant communications are occurring in a given period of time. Tracking metadata controller communications may include, for example, examining the entire contents of a message, examining a portion (e.g., CRC, ECC) of a message, examining data computed from all or part of a message (e.g., a hash), and examining other things.

In one embodiment, the second logic 744 is configured to perform metadata controller communications using a data based message type. Thus, in one example, the second logic 744 is configured to populate a metadata controller communication of the data based message type with state or location information about a metadata controller. The data based message type may include, for example, state information and/or location information. The state information may describe a condition(s) existing at a metadata controller. The location information may describe which server and/or server process is hosting the metadata controller. Other state and location information may be included. Additionally, other information about a metadata controller may be provided. This data based message type carries actual data and thus may be larger than the data identifier based message described below.

In one embodiment, the third logic 746 is configured to perform metadata controller communications using a data identifier based message type. Thus, in one example, the third logic 746 is configured to populate a metadata controller communication of the data identifier based message type with a representation of state or location information about a metadata controller. The representation may be, for example, a hash computed from the state and/or location information, a checksum computed from the state and/or location information, or other representation that facilitates detecting a change in the state or location information about the metadata controller.

In one embodiment, the fourth logic 748 is configured to control whether metadata controller communications are performed by the second logic 744 or the third logic 746. In one embodiment the fourth logic 748 is configured to control metadata controller communications as a function of the tracking data produced by the first logic 742. The fourth logic 748 may control the second logic 744 to perform metadata controller communications upon determining that a metadata controller state change has occurred. The fourth logic 748 may control the third logic 746 to perform metadata controller communications upon determining that a metadata controller state has not changed within a threshold period of time. Thus, the fourth logic 748 controls which message type is used for metadata controller communications based on tracking data produced by the first logic 742.

In one example, the first logic 742 is configured to track metadata controller communications on a per metadata controller basis. Thus, the fourth logic 748 may also be configured to control the second logic 744 and the third logic 746 on a per metadata controller basis. In another example, the first logic 742 may track metadata controller communications on an aggregate basis and thus fourth logic 748 may control the second logic 744 and the third logic 746 on an aggregate basis.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result.

It has proven convenient at times, principally for reasons of common usage, to refer to these signals as bits, values, elements, symbols, characters, terms, numbers, and using other terms. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and other terms, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In one example, a method may be implemented as computer executable instructions. Thus, in one example, a non-transitory computer-readable medium may store computer executable instructions that if executed by a machine (e.g., processor) cause the machine to perform methods described herein.

Figure 8:
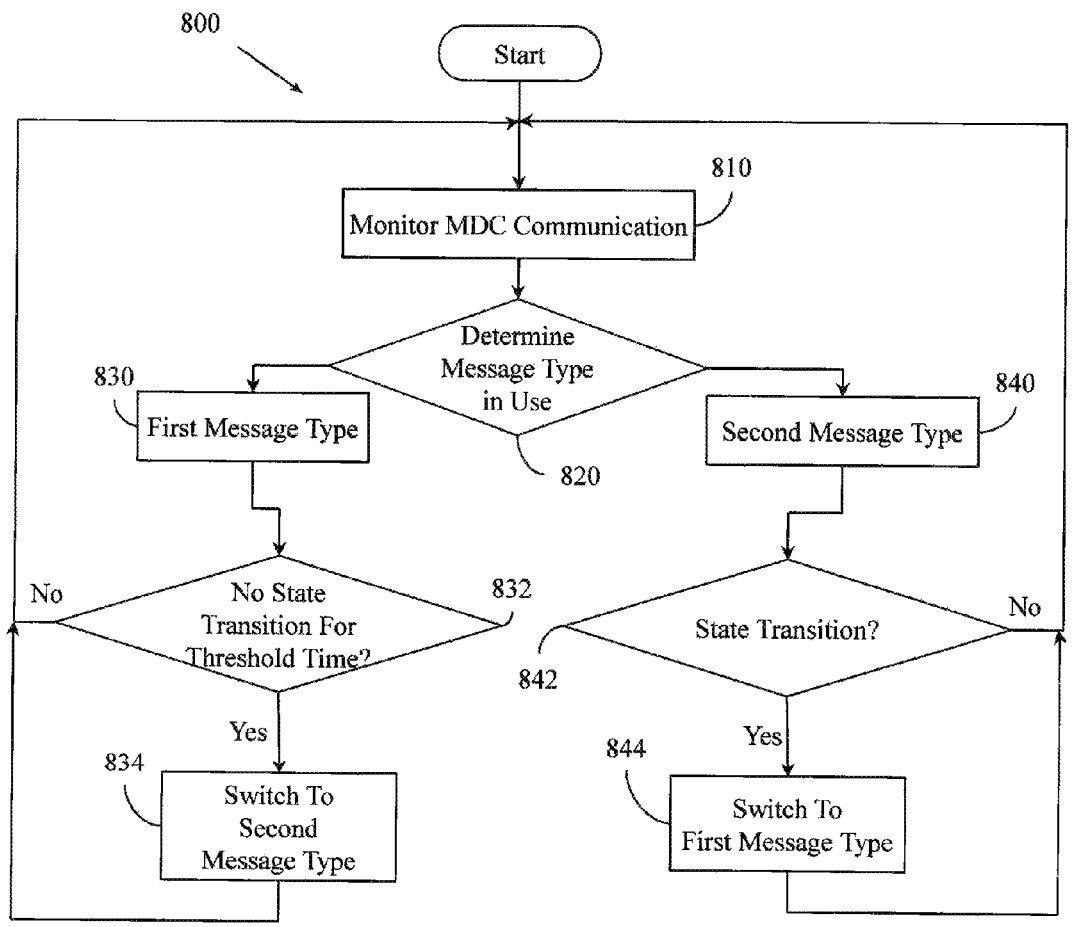
FIG. 8 illustrates an example method associated with reducing metadata controller communication volume.

FIG. 8 illustrates an example method 800 associated with reducing metadata controller communication volume. Method 800 includes, at 810, monitoring metadata controller communications associated with metadata controllers in a data management system. Monitoring the metadata controller communications can occur at locations including, but not limited to, a client, a client process, a server, a server process, a metadata controller, a metadata controller process, an operating system, an operating system process, a file system, a file system process, and a monitor process. Monitoring the metadata controller communications can include examining messages themselves or monitoring reports about messages. The reports about messages may be received from entities including, but not limited to, a client, a client process, a server, a server process, a metadata controller, a metadata controller process, an operating system, an operating system process, a file system, a file system process, and a monitor process.

Method 800 may proceed differently based on which type of message is currently in use. Thus, FIG. 8 illustrates determining, at 820, which type of message is in use. If metadata controller communications are currently using a first message type (e.g., data based) then processing may continue at 830. But if metadata controller communications are currently using a second message type (e.g., data identifier based) then processing may continue at 840. In some embodiments, no determination about what type of message is currently in use may be made. Instead, the decisions concerning whether a state transition has occurred or whether a threshold number of redundant messages have been encountered may be made serially or in parallel.

If the second message type is in use, then method 800 may proceed, at 842, to determine whether a metadata controller has experienced a selected state transition. In one example, only selected state transitions may lead to changing message types because only selected state transitions may cause changes in data in which both parties are interested. In one example, upon determining at 842 that a metadata controller has experienced a selected state transition, processing may proceed to 844 where method 800 will selectively control the data management system to perform metadata controller communications associated with the metadata controller using the first message type. Recall that a message of the first message type includes state data associated with the metadata controller. In one example, the state data associated with the metadata controller includes information including, but not limited to, a metadata controller load state, a metadata controller security state, a metadata controller communication state, a metadata controller resource state, and a metadata controller delay state. In one example, the state data associated with the metadata controller includes location information. The location information may identify, for example, a server on which a metadata controller resides or a server process in which a metadata controller may reside.

If the determination at 820 is that first message type is in use, then method 800 may proceed, at 832, to determine whether the metadata controller has not experienced a state transition and that a threshold number of redundant messages of the first type have been encountered. In one example, upon determining at 832 that the metadata controller has not experienced the selected state transition within a threshold period of time, method 800 may proceed, at 834, to selectively control the data management system to perform metadata controller communications associated with the metadata controller using the second, different message type. Recall that the second message type may be data identifier based and thus may be smaller than the first message type. In one example, a message of the second message type includes metadata concerning the state data associated with the metadata controller and does not include the state data associated with the metadata controller. To facilitate determining whether the metadata controller has changed state, the metadata concerning the state data holds information sufficient to detect the selected state transition in the metadata controller.

In one embodiment, the second message type may be characterized by or include a sender information identifier and a receiver information identifier. The sender information identifier provides information about the sender without providing the data at the sender. The sender information identifier is designed to provide a receiver with insights into the sender's knowledge about the sender's state and/or data. Thus, in one example, the sender information identifier includes a value representing sender state information. This value (e.g., hash) is sufficient to detect a change in the sender state information.

Similarly, the receiver information identifier provides information about the receiver without sending back to the receiver all the data the receiver previously sent to the sender. The receiver information is designed to provide a receiver with insights into the sender's knowledge about the receiver's state and/or data. Thus, in one example, the receiver information identifier includes a value representing receiver state information. Like the sender information identifier, the receiver information identifier value (e.g., hash) is sufficient to detect a change in the receiver state information.

When the receiver receives the second message, the receiver may take two actions. The receiver may look at its own data and look at the sender's knowledge about the receiver's data as presented in the receiver identifier information. If the receiver's knowledge about its information match the sender's knowledge about the receiver's information, then a change in message type is unnecessary. Additionally, the receiver may look at the sender's knowledge about the sender's data as presented in the sender identifier information and may look at its own knowledge about the sender's data. If the receiver's knowledge about the sender's data match the sender's knowledge about the sender's data then once again a change in message type is unnecessary. However, when there is a disconnect between the receiver's knowledge about data and the sender's knowledge about data, then the receiver or other actor may ask to change back to the first message type to facilitate capturing up-to-date and accurate information so that the sender and receiver will have the same data.

In one example, determining at 842 that the metadata controller has not experienced the selected state transition within the threshold period of time includes counting a number of redundant metadata controller communications of the first message type that have been encountered in a measured period of time.

While FIG. 8 illustrates various actions occurring in serial, it is to be appreciated that various actions illustrated in FIG. 8 could occur substantially in parallel. By way of illustration, a first process could decide whether to switch from the first message type to the second message type while a second process could decide whether to switch from the second message type to the first message type. While two processes are described, it is to be appreciated that a greater and/or lesser number of processes could be employed and that lightweight processes, regular processes, threads, and other approaches could be employed.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and other combinations (e.g., the data store may store only A, only B, only C, A&B, A&C, B&C, A&B&C, A&A&A, A&A&B, A&A&B&B, A&A&B&B&C, A&A&B&B&C&C, and other combinations). It is not intended to require one of A, one of B, and one of C. When the applicants intend to indicate "at least one of A, at least one of B, and at least one of C", then the phrasing "at least one of A, at least one of B, and at least one of C" will be employed.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

What is claimed is:

1. A non-transitory computer-readable medium storing computer-executable instructions that when executed by a computer cause the computer to perform a method, the method comprising:
   monitoring metadata controller communications associated with metadata controllers in a data management system;
   upon determining that a metadata controller has experienced a selected state transition, selectively controlling the data management system to perform metadata controller communications associated with the metadata controller using a first message type, where a message of the first message type includes state data associated with the metadata controller; and
   upon determining that the metadata controller has not experienced the selected state transition within a threshold period of time, selectively controlling the data management system to perform metadata controller communications associated with the metadata controller using a second, different message type,
   where a message of the second message type includes metadata concerning the state data associated with the metadata controller and does not include the state data associated with the metadata controller, where the metadata concerning the state data holds information sufficient to detect the selected state transition in the metadata controller, and where a message of the second message type is smaller than a message of the first message type.

2. The non-transitory computer-readable medium of claim 1, where the state data associated with the metadata controller includes information describing one or more of, a metadata controller load state, a metadata controller security state, a metadata controller communication state, a metadata controller resource state, and a metadata controller delay state.

3. The non-transitory computer-readable medium of claim 1, where the state data associated with the metadata controller includes location information.

4. The non-transitory computer-readable medium of claim 1, where the message of the second message type includes a sender information identifier.

5. The non-transitory computer-readable medium of claim 4, where the sender information identifier includes a value representing sender state information, where the value is sufficient to detect a change in the sender state information.

6. The non-transitory computer-readable medium of claim 1, where the message of the second message type includes a receiver information identifier.

7. The non-transitory computer-readable medium of claim 6, where the receiver information identifier includes a value representing receiver state information, where the value is sufficient to detect a change in the receiver state information.

8. The non-transitory computer-readable medium of claim 1, where determining that the metadata controller has not experienced the selected state transition within the threshold period of time comprises counting a number of redundant metadata controller communications of the first message type that have been encountered in a measured period of time.

9. The non-transitory computer-readable medium of claim 1, where the metadata concerning the state data includes a value produced by hashing the state data associated with the metadata controller.

10. The non-transitory computer-readable medium of claim 1, where a message of the second message type is at least fifty percent smaller than a corresponding message of the first message type.

11. The non-transitory computer-readable medium of claim 1, where a message of the second message type is at least ninety five percent smaller than a corresponding message of the first message type.

12. An apparatus, comprising:
    a processor;
    a memory;
    a set of logics; and
    an interface to connect the processor, the memory, and the set of logics, the set of logics comprising:
       a first logic configured to producing tracking data by tracking metadata controller communications;
       a second logic configured to perform metadata controller communications using a data based message type, where the second logic is configured to populate a metadata controller communication of the data based message type with state or location information about a metadata controller;
       a third logic configured to perform metadata controller communications using a data identifier based message type, where the third logic is configured to populate a metadata controller communication of the data identifier based message type with a representation of state or location information about the metadata controller, where the representation is configured to facilitate detecting a change in the state or location information about the metadata controller; and
       a fourth logic configured to control whether metadata controller communications are performed by the second logic or the third logic, where the fourth logic is configured to control metadata controller communications based, at least in part, on the tracking data,
       where the fourth logic is configured to control the second logic to perform metadata controller communications upon determining that the metadata controller has experienced a selected state change, and where the fourth logic is configured to control the third logic to perform metadata controller communications upon determining that the metadata controller has not experienced the selected state change within a threshold period of time.

13. The apparatus of claim 12, where the first logic is configured to track metadata controller communications on a per metadata controller basis.

14. The apparatus of claim 13, where the fourth logic is configured to control the second logic and the third logic on a per metadata controller basis.

* * * * *